United States Patent [19]

Elpern

[11] Patent Number: 4,656,834
[45] Date of Patent: Apr. 14, 1987

[54] ELECTRONIC TURBOCHARGER CONTROL

[75] Inventor: David G. Elpern, Los Angeles, Calif.

[73] Assignee: The Garrett Corporation, Los Angeles, Calif.

[21] Appl. No.: 813,114

[22] Filed: Dec. 24, 1985

[51] Int. Cl.⁴ ............................................. F02D 23/00
[52] U.S. Cl. ......................................... 60/602; 251/68
[58] Field of Search ................. 60/600, 601, 602, 603; 251/66, 68

[56] References Cited

U.S. PATENT DOCUMENTS

| | | | |
|---|---|---|---|
| 2,388,350 | 11/1945 | Taylor | 60/602 |
| 2,485,433 | 10/1949 | Crum | 60/602 |
| 2,487,049 | 11/1949 | Gille | 60/602 |
| 2,537,902 | 1/1951 | Ludwig | 60/602 |
| 2,579,643 | 12/1951 | Baak | 60/611 |
| 2,612,225 | 9/1952 | Sparrow | 60/602 |
| 2,627,370 | 2/1953 | Crum | 60/602 |
| 2,713,335 | 7/1955 | Peterson | 60/602 |
| 3,925,989 | 12/1975 | Pustelnik | 60/602 |
| 4,174,617 | 11/1979 | Jalali-Karchay | 60/602 |
| 4,378,677 | 4/1983 | Zumstein | 60/606 |
| 4,459,808 | 7/1984 | Rydquist et al. | 60/602 |
| 4,459,809 | 7/1984 | Tadokoro et al. | 60/602 |

*Primary Examiner*—Stephen F. Husar
*Attorney, Agent, or Firm*—James W. McFarland; Albert J. Miller

[57] ABSTRACT

An electrically responsive turbocharger control for a turbocharged internal combustion engine includes an electrically operated control device selectively energizable to engage and lock in position the actuator for a wastegate control valve. This control device provides a manner of overriding the normal actuating forces acting in the wastegate control valve.

24 Claims, 5 Drawing Figures

ELECTRONIC TURBOCHARGER CONTROL

BACKGROUND OF THE INVENTION

This invention relates to turbochargers for supplying relatively high pressure charge air to an internal combustion engine. More particularly, this invention relates to an improved electronically responsive control for adjusting wastegate valve position to control turbocharger operation.

Turbochargers are well known in the prior art, and typically comprise a turbine wheel and a compressor wheel mounted on a common shaft and carried within an appropriate housing. The housing adjacent the turbine wheel includes a gas inlet and a gas outlet, and is coupled to the engine exhaust gas manifold for circulation of the exhaust gas through the turbine engine housing to rotatably drive the turbine wheel. In turn, the turbine wheel rotatably drives the compressor wheel which compresses ambient air and supplies the compressor, pressurized air to the intake manifold of the engine.

The use of turbochargers is highly advantageous when compared with conventional naturally aspirated engines in that substantially higher density fuel air mixtures may be delivered to the engine cyclinders. This increased fuel air density results in substantially improved engine performance and efficiency. Turbocharger controls are typically included, for example, to limit the boost pressure of pressurized air delivered to the engine intake manifold.

One type of turbocharger control typically comprises a valved apparatus, commonly referred to as a wastegate valve, for bypassing a portion of the engine exhaust gases around the turbine wheel. In this manner a portion of the exhausted gases is prevented from driving the turbine wheel so that the turbine wheel rotates at less than maximum speed such that the compressor wheel is also driven less than maximum speed. Structurally, some of these bypass devices comprise a bypass passage integrally cast as part of the housing, along with a bypass or wastegate valve mounted within this bypass passage.

With the advent of digital electronic controls for controlling operation of an internal combustion engine, a variety of fast response control signals responsive to a variety of engine operating parameters are fed to a primary electronic control unit which develops electronic control systems for adjusting, for example, fuel flow, spark advance and timing, as well as a variety of other engine operating control systems. Yet most wastegate controls include pneumatic actuators responsive to engine pressure such as intake manifold pressure.

In automotive applications, it is important that the control system for a turbocharger be relatively simple, economical and, importantly, quite rugged for the relatively extreme environment presented by the turbocharger system.

SUMMARY OF THE INVENTION

It is an important object of the present invention to provide an improved control for turbochargers which is quite simple and rugged in design, yet is capable of utilizing electronic control signals for rapid, accurate turbocharger control.

More particularly, the present invention contemplates and improved wastegate control apparatus and method wherein a wastegate which is normally positioned by the opposing forces of a spring bias and the force of the pressure of engine exhaust gas flow, is responsive to an electronic control system signal to lock the wastegate valve in any position thereof in a manner overriding the actuating forces acting thereon.

In summary, a preferred embodiment of the invention contemplates a turbocharger method and apparatus wherein the turbocharger housing adjacent the turbine wheel presents a bypass passage, and there is included a wastegate valve within such passage to modulate the bypass flow therethrough to control turbine speed and thus turbocharger operation. Pressure of engine exhaust gas tends to open the valve, while a spring bias opposes the exhaust gas pressure to tend to close the valve. Additionally, an actuator rod is secured to the valve for positioning the latter. Control means responsive to an electronic control signal, are electrically energizable to act as brake for clamping the actuator rod to hold the wastegate valve in its present position and prevent further movement thereof in response to the engine exhaust gases pressure or the spring bias presssure. Upon deenergization of the electrical control, the actuator rod is released to permit movement of the wastegate valve in response to the engine exhaust gas pressure and the spring bias.

In this manner the present invention provides a highly simplified electronic control for adjusting wastegate valve position. In a preferred embodiment, the invention is utilized with a pressure sensor which generates an electrical signal responsive to the pressure discharge pressure. The signal, through an electronic processing control unit, is fed to energize and deenergize the control for locking and unlocking the actuator rod.

Another important object of the present invention is it provides such an improved electronic wastegate control system and method which, in the event of electrical failure, provides safe turbocharger operation at a somewhat degraded performance level so as to protect the overall engine system.

These an other objects and advantages of the present invention are specifically set forth in or will become apparent from the following detailed description of preferred forms of the invention when read in conjunction with accompanying drawings.

DETAILED DESCRIPTION OF THE PREFERRED EMBODIMENT

Figure 1:
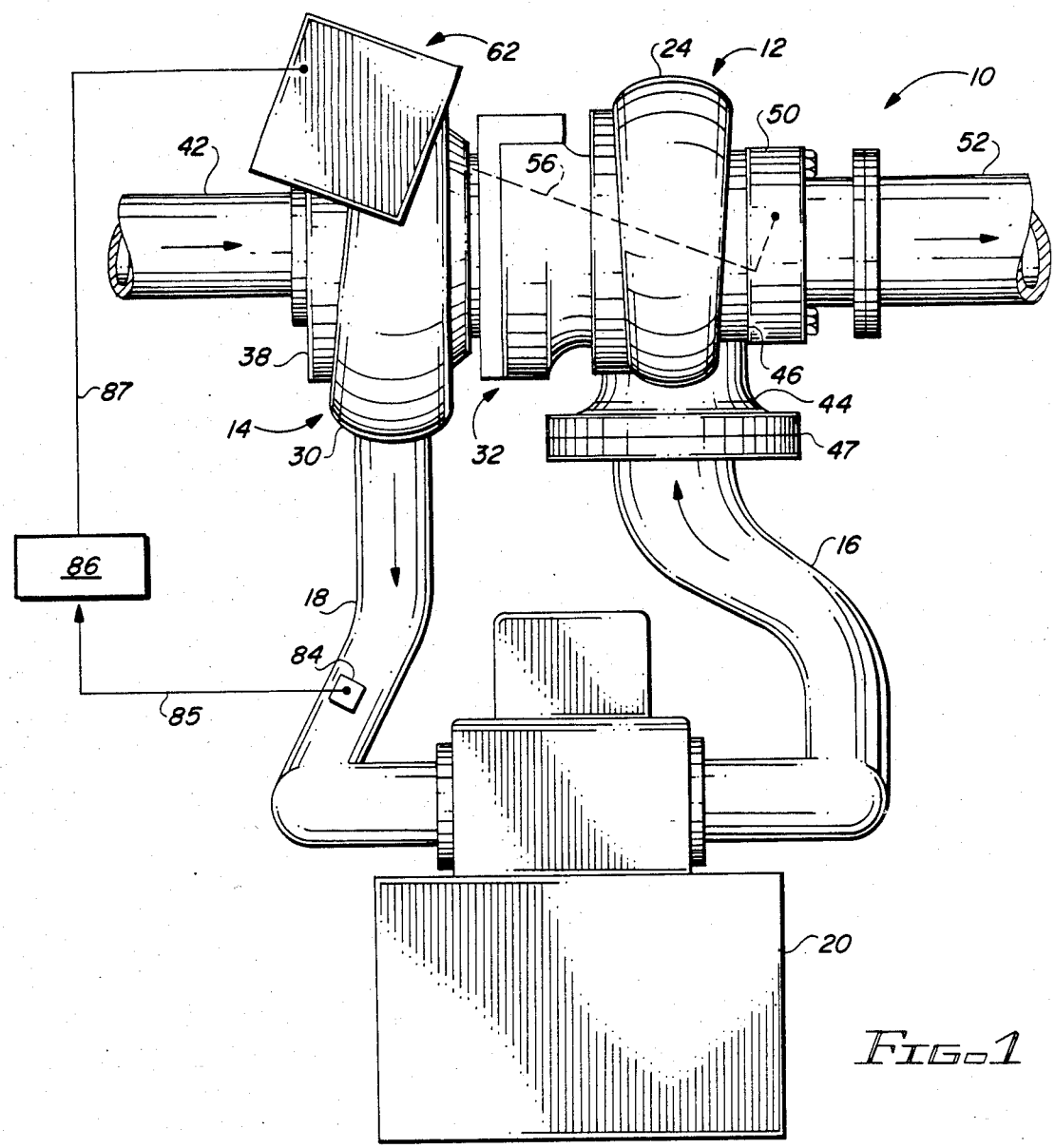
FIG. 1 is a schematic diagram of a controlled turbocharger of the present invention along with an internal combustion engine.
Figure 2:
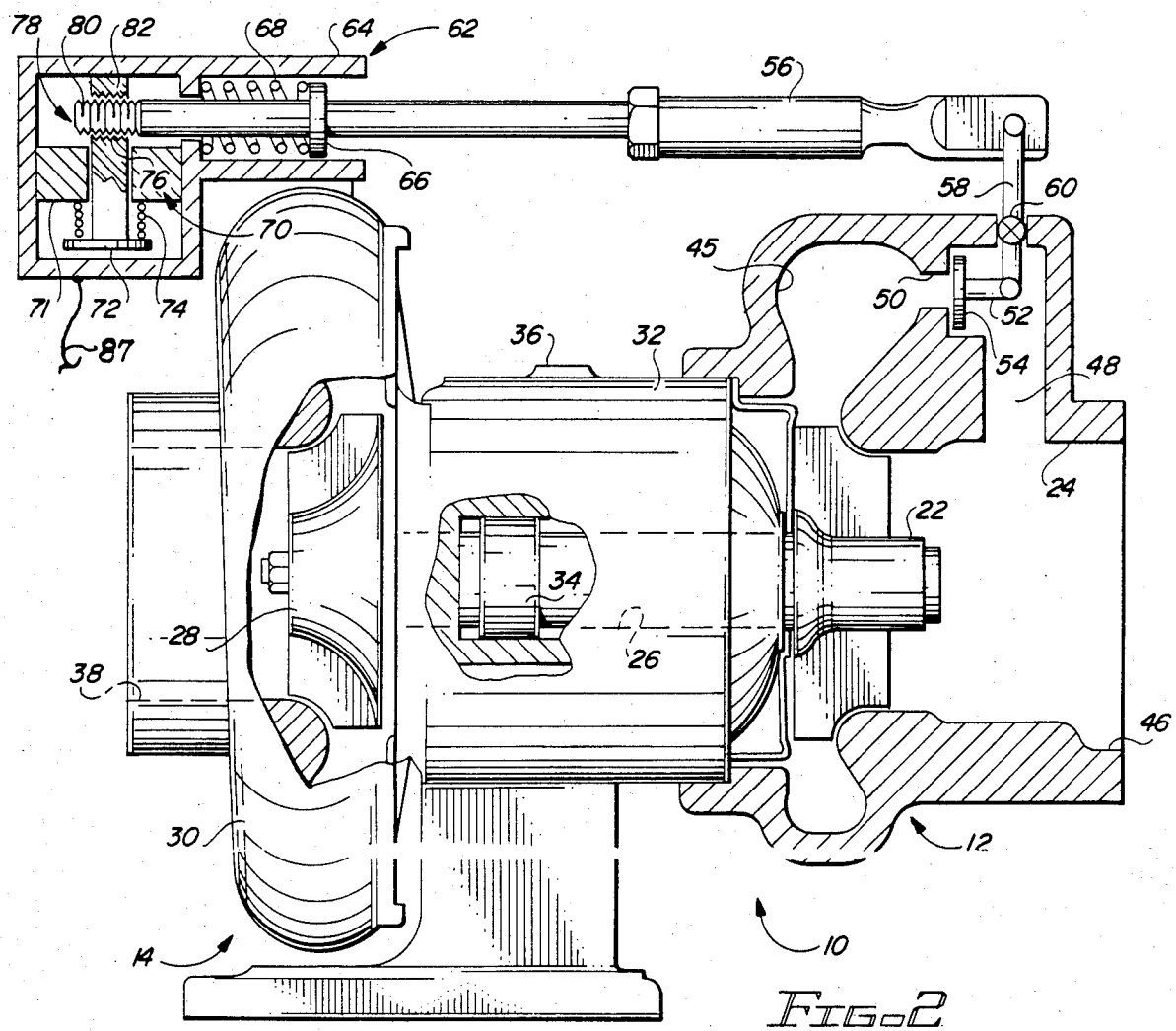
FIG. 2 is a side elevational view of the turbine and control, with portions shown in cross-section to reveal internal details of construction, and with other portions shown schematically.

Referring now more particularly to FIGS. 1 and 2, a turbocharger 10 generally comprises a turbine 12 and compressor 14 coupled to the exhaust gas manifold 16 and air intake manifold 18, respectively, of an internal combustion engine 20. The turbine comprises the turbine wheel 22 positioned within a generally scroll shaped turbine housing 24, and mounted for simultaneous rotation on a common shaft 26 with a compressor wheel 28 carried within a compressor housing 30. The turbine housing 24 and the compressor housing 30 are mounted on opposite ends of a center housing assembly 32 which includes bearings 34 for supporting the common shaft 26. Conveniently, oil ports 36 are provided in the center housing assembly 32 for facilitating location of the bearings 34 and shaft 26.

The compressor housing 30 includes an air inlet 38 through which ambient air is drawn axially into the compressor housing 30 upon rotation of compressor wheel 28. Compressor wheel 28 compresses and pressurizes the incoming air, and discharges this compressed air to the air intake manifold 18 of the engine such that compressor 14 supplies the engine with charge air at an elevated pressure.

Compressor wheel 28 is rotatably driven by turbine wheel 22, which is in turn driven by exhaust gas discharging from the engine 20. More specifically, the turbine housing 24 includes an exhaust gas inlet 44 and exhaust gas outlet 46, both in communication interior of the turbine housing 24. The exhaust gas inlet 44 is coupled to the exhaust gas manifold 16 of the engine 20 so that hot exhaust gases expelled from the engine pass through the turbine housing gas inlet 44 and impinge upon the blade of turbine 22 to rotatably drive the latter. Exhaust gases exit turbine housing 24 in a generally axial direction through gas exhaust outlet 46 for subsequent passage to any suitable exhaust gas system 52 for the engine.

A most clearly illustrated in FIG. 2, the turbine portion of housing 24 further includes a bypass passage 48 extending between the exhaust gas outlet 46 and the scroll portion 45 of the exhaust gas inlet. Bypass passage 48 communicates with inlet scroll 45 via a bleed hole 50. Disposed within bypass passage 48 is a turbine bypass or wastegate valve 52 provided for controllably opening and closing bleed hole 50 to control the bypassing of exhaust gases around turbine wheel 22. The illustrated form of valve 52 comprises a substantially flat, circular valve head 54 of larger diameter than bleed hole 50.

Associated with valve 52 is a linearly movable actuator rod 56 having one end connected to suitable linkage for moving valve 52. The illustrated form of this linkage includes a lever 58 having opposed arms respectively attached to valve 52 and the end of rod 56, the lever 58 being pivotally secured to housing 24 as schematically illustrated at pivot point 60.

The opposite end of actuator rod 56 is movably received within a control device 62 having a housing 64 secured to compressor housing 30. Control device 62 is preferably located adjacent the compressor portion of turbocharger 10 to minimize the high temperature environment to which it is exposed. Extending between housing 64 and a raised land 66 on actuator rod 56 is a biasing means in the form of a helical coil compression spring 68. Spring 68 exerts a biasing force urging actuator rod 56 in a direction which moves valve 52 toward a closed position interrupting fluid flow through bypass passage 48.

Control device 62 includes an electrically energizable solenoid 70 having a winding 71 and central armature 72. A spring 74 lightly preloads armature 72 toward the position illustrated in FIG. 2. One end of armature 72 is of serrated configuration presenting a plurality of teeth, or lands and grooves 76.

An end portion 78 of actuator rod 56 is also configured with a plurality of lands and grooves on the outer peripheral thereof presenting teeth 80 complementally arranged to those at the end 76 of armature 72. Teeth 80 extend over a significant length of the rod 56 such that within the limit of travel of actuator rod 56 there are alway presented teeth 80 in general alignment with the complementally configured end 76 of armature 72. To the side of actuator rod 56 opposite that of armature 72 may be included a stem 82 having a complementally configured teeth arrangement in general alignment with end 76 of armature 72.

Upon energization of winding 70 by an appropriate electrical signal, armature 72 is shifted such that end 76 comes into locking engagement with end 76 of actuator rod 56. In conjunction stem 82, this effectively locks actuator rod 56 in position, overriding the forces of spring 68 and the pressure of gas in inlet scroll 45 in tending to move valve 52.

As depicted in FIGS. 1 and 2, a pressure-to-electrical transducer 84 is disposed in the engine intake manifold and/or discharge portion of compressor housing 30 to sense intake manifold pressure. This engine operating parameter is transformed into electrical signal transmitted by line 85 to an electrical control unit 86. The electrical control unit 86 may be common with that utilized with the internal combustion engine to control a variety of engine operating parameters. An electrical control signal from a electrical control unit 86 is transmitted to energize and deenergize the control device solenoid 70 via line 87.

Figure 3:
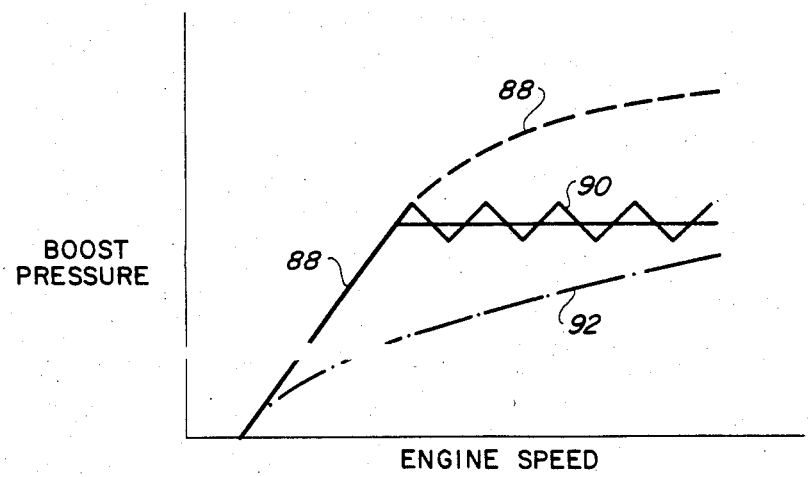
FIG. 3 is a graphical plot of intake manifold boost pressure versus engine speed.

In operation, upon engine start the bias of spring 68 maintains wastegate valve 52 in a closed position. As the engine develops power the pressure in intake manifold 18 less than the desired boost pressure; therefore sensor 84 generates a signal through electronic control unit 86 to energize solenoid 70 and shift armature 72 into locking relationship with actuator 56. Thus valve 52 is locked in a closed position. Engine exhaust from manifold 16 is directed into turbine gas inlet 44 and inlet scroll 45 to pass across turbine 22 and rotatably drive the latter. Gases subsequently exhaust through outlet 46. Rotation of turbine 22 causes compressor 28 to compress and pressurize air being delivered to intake manifold 18. With wastegate 52 closed, the intake manifold pressure or boost pressure in manifold 18 follows curve 88 illustrated in FIG. 3.

Once a preselected, desired boost pressure is reached and sensed by transducer 84, a control signal from electronic control unit 86 deenergizes solenoid 70. The armature releases from actuator 56 to allow movement of valve 52. The pressure differential between inlet scroll 45 and exhaust passage 46 is such that a force is exerted on valve 52 to move the latter toward a fully open position; i.e. in a direction uncovering bleed hole 58 to permit bypass flow through passage 48.

The resulting reduction in exhaust gas motive flow across turbine 22 reduces the kinetic energy being imparted thereto, and accordingly rapidly reduces the kinetic energy imparted by the compressor 28 to airflow being delivered to intake manifold 18. Intake manifold pressure promptly begins decreasing. In response transducer 84 generates an appropriate signal through electrical control unit 86 to again energize solenoid 70 to shift armature 72 into locking engagement with actuator 56. As a result actuator 56 is then locked in a slightly open position. This process continues with the solenoid 70 being energized and deenergized as boost pressure sensed by transducer 84 varies in very close proximity to the preselected, desired boost pressure. As a result the control system thereby controls boost pressure to the desired preselected level as illustrated by curve 90 in FIG. 3, wherein a small dither in pressure is shown in exaggerated schematic form.

It will therefore be seen that control 62 acts as an electrically operated control brake which holds the wastegate 52 in a closed position until desired boost pressure is reached. Sensor 84 detects this pressure and electronic control unit 86 sends a signal to brake 62 to release the control rod 56. By virtue of pressure in scroll 45 the wastegate valve 52 will then open causing boost pressure to drop. When boost pressure drops below a set value the brake 62 is again reactivated to hold the wastegate in a fixed position. This causes boost pressure to rise again until the desired, preselected control pressure is reached. In this manner boost pressure can be controlled electrically at any desired level between the curves 88 and 92 illustrated in FIG. 3. Curve 88 illustrates the boost pressure that would be developed should the wastegate 52 never be opened, while curve 90 illustrates the boost pressure which would be permitted in the event that the spring 68 alone is controlling boost pressure in opposition to pressure in scroll 45.

From the foregoing it will also be apparent that in the event of failure, for example an electronic power failure, solenoid 70 is deenergized to release actuator rod 56. As a result actuator rod 56 will be continually positioned solely by the opposing forces exerted by spring 68 and scroll pressure and the pressure in scroll 45. The boost pressure is thereby controlled downwardly to the curve 92 of FIG. 3. Accordingly, in the event of failure, the engine is protected and a certain amount of boost pressure, perhaps degraded from the desired characteristics, is still available for improved engine operation.

Figure 4:
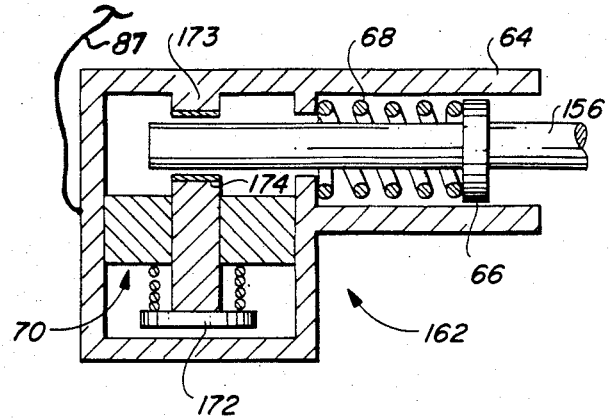
FIG. 4 is a vertical cross-sectional view of an alternate embodiment of the control device of the present invention.

An alternate embodiment for control 62 is illustrated in FIG. 4. The control 162 thereof again includes a housing 64 preferably secured to the compressor housing, which housing 64 movably receives the end portion of actuator rod 56. Again spring 68 acts via land 66 to urge rod 56 to move the wastegate valve to a closed position.

In the FIG. 4 arrangement the end of armature 172 which is engageable with a non-grooved actuator rod 156 is provided with a pad of high frictional material 174. Preferably also, an opposing stem 173 is also provided with high frictional pad at the end thereof. Once solenoid 70 is energized, armature 172 is shifted such that the friction pad 174 firmly clamps upon actuator rod 156 to effect the locking thereof.

Figure 5:
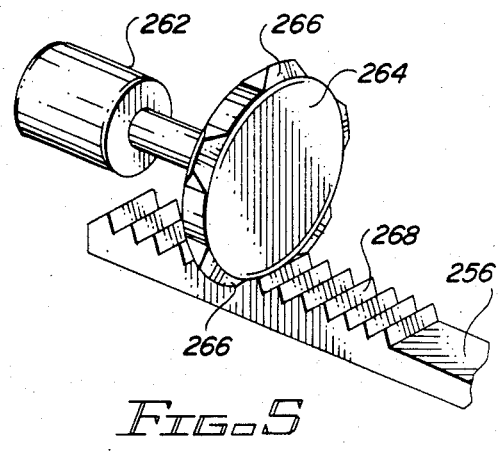
FIG. 5 is a perspective view of another embodiment of the invention.

Another embodiment of control device 62 is illustrated in FIG. 5. The control device in FIG. 5 comprises an electrical stepper motor 262 whose structure, function and operation are well known in the art. Stepper motor 262 includes a ratchet wheel 264 having teeth 266 on the outer periphery thereof which are selectively engageable with grooves 268 on the outer surface of the actuator rod 256. Again, upon energization of the motor 262, the ratchet wheel is rotatably stepped such that one of its teeth engages a mating groove 268 on the actuator rod to lock the latter. A further stepping of motor 262 shifts the tooth 266 away from groove 268 to permit unencumbered axial shifting of the actuator rod 256.

From the foregoing it will be apparent that the present invention provides an improved method for adjusting speed of a turbine of an exhaust gas driven turbocharger wherein motive gas flow is directed in parallel relationship both to the drive turbine and to a wastegate duct or passage which bypasses the turbine. The method includes the steps modulating a exhaust gas flow through this wastegate or bypass duct by variably positioning wastegate valve 52. Pressure exhaust gas flow in scroll 45 urges valve 52 toward a fully open position while the bias of spring 68 acts upon actuator 56 to urge valve 52 toward a fully closed position. The method further includes the steps of generating an electrical control signal responsive to a preselected engine operating parameter such as an intake manifold boost pressure, and the step of overriding the forces exerted by the exhaust gas pressure in the spring bias to rigidly hold the actuator and wastegate valve against movement, all in response to the electrical control signal.

The foregoing detailed description of preferred forms of the invention should be considered exemplary in nature and not as limited to the scope and spirit of the invention as set forth in the appended claims.

Having described the invention with sufficient clarity that those skilled in the art make and use it, I claim:

1. A turbocharger comprising:
   a turbine adapted to be rotatably driven by exhaust gas flow from an engine;
   a compressor rotatably driven by said turbine and adapted to deliver pressurized airflow to the engine;
   housing means for defining a turbine gas inlet and outlet to direct gas flow to and from said turbine, and for defining a compressor air inlet and outlet to direct airflow to and from said compressor, said housing means further defining a wastegate passage interconnecting said turbine gas inlet and outlet in bypassing relation to said turbine;
   a valve in said wastegate passage for modulating the volume of gas flow therethrough in bypassing relation to said turbine, said valve arranged such that pressure of gas flow in said turbine gas inlet urge said valve toward an open position;
   an actuator operably engaging said valve for moving the latter;
   biasing means operably engaging said actuator for urging said valve toward a closed position;
   means for generating an electrical control signal in response to an engine operating parameter; and
   control means responsive to said electrical control signal for engaging and disengaging said actuator, said control means operable upon engaging said actuator to override the urgings of said biasing means and said turbine inlet pressure and hold said actuator and said valve stationary.

2. A turbocharger as set forth in claim 1 wherein said control means is a solenoid having an armature for engaging and disengaging said actuator.

3. A turbocharger as set forth in claim 1 wherein said signal means comprises means for generating an electrical signal in relation to compressor discharge pressure.

4. A turbocharger comprising:
   a turbine adapted to be rotatably driven by exhaust gas flow from an engine;
   a compressor rotatably driven by said turbine and adapted to deliver pressurized airflow to the engine;
   housing means for defining a turbine gas inlet and outlet to direct gas flow to and from said turbine, and for defining a compressor air inlet and outlet to direct airflow to and from said compressor, said housing means further defining a wastegate passage interconnecting said turbine gas inlet and outlet in bypassing relation to said turbine;

a valve in said wastegate passage for modulating the volume of gas flow therethrough in bypassing relation to said turbine, said valve arranged such that pressure of gas flow in said turbine gas inlet urges said valve toward an open position;

a linearly shiftable actuator rod movably mounted to said housing means and connected to said valve for moving the latter between said open position and a closed position;

a spring extending between said housing means and said actuator rod for urging the latter to move said valve toward said closed position;

an electrically energizable control device having a member movable into locking engagement with said actuator rod upon energization of said control device to hold said rod and said valve in position against the opposing forces of said spring and said pressure of gas flow, said member being released from locking engagement with said rod upon deenergization of said control device to permit said valve to move in response to said opposing forces; and means for generating an electrical signal to energize said control device.

5. A turbocharger as set forth in claim 4 wherein said control device is a solenoid, and said member is an armature of said solenoid.

6. A turbocharger as set forth in claim 5 wherein said actuator includes a rod having a plurality of grooves, said armature being movable into one of said grooves to lock said actuator rod upon energization of said solenoid.

7. A turbocharger as set forth in claim 5 wherein said actuator rod includes a plurality of grooves, said armature being movable into one of said grooves to lock said actuator rod upon energization of said solenoid.

8. A turbocharger as set forth in claim 5 wherein said actuator rod is configured with a plurality of teeth on the outer surface of a portion of said actuator rod, said armature having an end configured with teeth for mating, locking interengagement with said teeth of the actuator rod.

9. A turbocharger as set forth in claim 5 further including frictional material secured to one end of said armature for frictional, locking engagement with said actuator rod upon energization of said solenoid.

10. A turbocharger as set forth in claim 4 wherein said control device is an electrical stepper motor, and said member is a ratchet wheel driven by said motor, said ratchet wheel having ratchet teeth about the periphery thereof, said actuator rod having a plurality of lands and grooves for lockably receiving one of said ratchet teeth, said stepper motor upon energization effecting locking engagement of said ratchet teeth with said rod.

11. A turbocharger as set forth in claim 4 wherein said signal means comprises means for generating an electrical signal in relation to compressor discharge pressure.

12. In a wastegate controlled turbocharger:

a turbine adapted to be rotatably driven by engine exhaust gas flow;

a housing defining a gas inlet and gas outlet for directing engine exhaust gas flow to and from said turbine, said housing defining a wastegate passage interconnecting said gas inlet and outlet in bypassing relationship to said turbine;

a valve in said wastegate passage movable to modulate flow of exhaust gas through said wastegate passage, said valve arranged to be urged toward an open position by inlet pressure in said gas inlet;

biasing means for urging said valve toward a closed position;

an actuator operably connected to said valve;

signal means for generating an electrical control signal; and control means responsive to said signal means for engaging said actuator, said control means operable to hold said actuator and said valve relatively stationary upon engaging said actuator.

13. In a turbocharger having an exhaust gas driven turbine, a duct for carrying exhaust gas in bypassing, nondriving relationship to the turbine, and a valve in said wastegate duct for modulating flow of exhaust gas therethrough to control turbine speed:

an actuator operably associated with said valve for moving the latter;

biasing means operably engaging said actuator for urging said valve toward a closed position, said valve arranged such that the pressure of exhaust gas in said wastegate duct urges said valve toward an open position;

signal means for generating an electrical control signal; and control means responsive to said signal means for engaging said actuator, said control means operable to hold said actuator and said valve relatively stationary upon engaging said actuator.

14. In a turbocharger having an exhaust gas driven turbine, a wastegate duct for carrying exhaust gas in bypassing, nondriving relationship to the turbine, and a valve in said wastegate duct for modulating flow of exhaust gas therethrough to control turbine speed:

an actuator rod connected with said valve for moving the latter;

biasing means operably engaging said actuator rod for urging said valve toward a closed position, said valve arranged such that the pressure of exhaust gas in said wastegate duct urges said valve toward an open position; and an electrically energizable control brake movable to a position relatively rigidly engaging said actuator rod to prevent movement of said rod and said valve upon energization of said control brake, said control brake upon being deenergized permitting movement of said rod and said valve.

15. A turbocharger as set forth in claim 14 wherein said control brake includes a solenoid having an armature movable into locking engagement with said actuator rod upon energization of said solenoid.

16. A turbocharger as set forth in claim 15 wherein said actuator rod includes a plurality of grooves, said armature being movable into one of said grooves to lock said actuator rod upon energization of said solenoid.

17. A turbocharger as set forth in claim 15 wherein said actuator rod is configured with a plurality of teeth on the outer surface of a portion of said actuator rod, said armature having an end configured with teeth for mating, locking interengagement with said teeth of the actuator rod.

18. A turbocharger as set forth in claim 15 further including frictional material secured to one end of said armature for frictional, locking engagement with said actuator rod upon energization of said solenoid.

19. A turbocharger as set forth in claim 14 wherein said control brake is an electrical stepper motor having a ratchet wheel with ratchet teeth about the periphery thereof, said actuator rod having a plurality of lands and grooves for lockably receiving one of said ratchet teeth, said stepper motor upon energization effecting locking engagement of said ratchet teeth with said rod.

20. A turbocharger as set forth in claim 14, further including signal means for generating an electrical signal to energize said control brake.

21. A turbocharger as set forth in claim 20 wherein said signal means comprises means for generating an electrical signal in relation to compressor discharge pressure.

22. A method for adjusting the speed of a turbine of an exhaust gas driven turbocharger, comprising the steps of:
   directing motive exhaust gas flow in parallel relationship to the turbine and to a wastegate duct bypassing the turbine;
   modulating exhaust gas flow through the wastegate duct by variably positioning a wastegate valve therein;
   utilizing the pressure of exhaust gas flow to urge the wastegate valve toward a fully open position;
   spring biasing an actuator attached to the wastegate valve in a direction urging the wastegate valve toward a fully closed position;
   generating an electrical control signal responsive to a preselected engine operating parameter; and
   energizing and deenergizing a control mechanism in response to said electrical control signal to respectively lock the actuator and wastegate valve against movement by the opposing forces of the exhaust gas pressure and the spring bias, and release the actuator for movement in response to said opposing forces.

23. A method for adjusting the speed of a turbine of an exhaust gas driven turbocharger, comprising the steps of:
   directing motive exhaust gas flow in parallel relationship to the turbine and to a wastegate duct bypassing the turbine;
   modulating exhaust gas flow through the wastegate duct by variably positioning a wastegate valve therein;
   utilizing the pressure of exhaust gas flow to urge the wastegate valve toward a fully open position;
   spring biasing an actuator attached to the wastegate valve in a direction urging the wastegate valve toward a fully closed position;
   generating an electrical control signal responsive to a preselected engine operating parameter; and
   overriding the forces exerted by the exhaust gas pressure and the spring bias and rigidly holding the actuator and wastegate valve against movement in response to said electrical control signal.

24. A method as set forth in claim 23 wherein said overriding step includes energizing a solenoid in response to said electrical signal to drive an armature of the solenoid into locking engagement with the actuator.

* * * * *